US008042584B2

(12) United States Patent
Takahashi

(10) Patent No.: US 8,042,584 B2
(45) Date of Patent: Oct. 25, 2011

(54) PNEUMATIC TIRE WITH TREAD HAVING RADIAL GROOVES AND SHUTOFF WALLS

(75) Inventor: Shingo Takahashi, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 1065 days.

(21) Appl. No.: 11/892,387

(22) Filed: Aug. 22, 2007

(65) Prior Publication Data

US 2008/0047641 A1    Feb. 28, 2008

(30) Foreign Application Priority Data

Aug. 23, 2006  (JP) .................................. 2006-226936

(51) Int. Cl.
  *B60C 11/03* (2006.01)
(52) U.S. Cl. .......... 152/209.21; 152/209.22; 152/DIG. 3
(58) Field of Classification Search ............. 152/209.18, 152/209.21, DIG. 3, 209.22
  See application file for complete search history.

(56) References Cited

U.S. PATENT DOCUMENTS

| | | | | |
|---|---|---|---|---|
| 4,166,490 A | * | 9/1979 | Poque ........................ | 152/209.1 |
| 4,362,201 A | * | 12/1982 | Zinnen et al. ............ | 152/209.22 |
| 5,031,680 A | * | 7/1991 | Kajikawa et al. ........ | 152/209.21 |
| 6,986,372 B2 | * | 1/2006 | Below ....................... | 152/209.21 |
| 2006/0042738 A1 | * | 3/2006 | Matsumoto ............... | 152/209.21 |

FOREIGN PATENT DOCUMENTS

| | | | |
|---|---|---|---|
| EP | 654365 | * | 5/1995 |
| EP | 0654365 B1 | | 1/1998 |
| GB | 460338 | * | 1/1937 |
| JP | 2003-146024 | * | 5/2003 |
| JP | 2003-146024 A | | 5/2003 |

OTHER PUBLICATIONS

Machine translation for Japan 2003-146024 (no date).*

* cited by examiner

*Primary Examiner* — Steven D Maki
(74) *Attorney, Agent, or Firm* — Birch, Stewart, Kolasch & Birch, LLP

(57) ABSTRACT

A pneumatic tire is provided in the tread portion (2) with a circumferential groove (3, 3b, 3c) extending continuously in the tire circumferential direction and having a pair of oppositely opposed groove walls (6). The circumferential groove (3, 3b, 3c) is provided in at least one of the groove walls (6) with radial grooves (9) arranged along the longitudinal direction of the circumferential groove (3). The radially outer end (9o) of the radial groove (9) is positioned in a range (a1) of from 0 to 20% of the depth (GDt) of the circumferential groove. The radially inner end (9i) of the radial groove (9) is positioned in a range (a2) of from 80 to 100% of the depth (GDt) of the circumferential groove. The radial groove has an opening width (g) of not less than 1.0 mm, but not more than 6.0 mm.

3 Claims, 4 Drawing Sheets

PNEUMATIC TIRE WITH TREAD HAVING RADIAL GROOVES AND SHUTOFF WALLS

BACKGROUND OF THE INVENTION

The present invention relates to a pneumatic tire, more particularly to a tread groove structure capable of improving stone-entrapment and noise performance without sacrificing wet performance.

It is well known to be effective for improving wet performance of a pneumatic tire to provide wide circumferential grooves in the tread portion. Such a wide tread groove is however very liable to trap small objects such as gravel stones therein. In the case of heavy duty tires having very rigid tread portions, small objects entrapped deep in a tread groove are hard to self-eject. As a result, the groove bottom and inner structure of the tread portion are liable to be injured by the entrapped objects.

On the other hand, in the case of a wide circumferential groove, an air column formed in the circumferential groove in the ground contacting patch is liable to resonate during running and the noise performance of the tire is deteriorated.

If the groove width is decreased, these problems may be solved, but as the drainage is decreased, deterioration of the wet performance is inevitable.

SUMMARY OF THE INVENTION

It is therefore, an object of the present invention to provide a pneumatic tire, in which self-ejecting of entrapped objects can be promoted, and the air-column resonance is reduced to improve the noise performance, without sacrificing wet performance of the tire.

According to the present invention, a pneumatic tire comprises a tread portion provided with a circumferential groove extending continuously in the tire circumferential direction and having a pair of oppositely opposed groove walls, the circumferential groove provided in at least one of the groove walls with radial grooves arranged along the longitudinal direction of the circumferential groove, each of the radial grooves having a radially outer end positioned in a range of from 0 to 20% of the depth of the circumferential groove, and a radially inner end positioned in a range of from 80 to 100% of the depth of the circumferential groove, and the radial groove having an opening width of not less than 1.0 mm, but not more than 6.0 mm.

Therefore, by the radial grooves, the resonance condition or mode of the air-column formed by the circumferential groove in the ground contacting patch is altered during running. Thus, the standing wave becomes hard to occur, namely, the air-column resonance can be effectively controlled to improve-noise performance. Further, owing to the radial grooves, the binding force (force binding the entrapped object in the groove) can be reduced and the entrapped object becomes easy to move, or if the entrapped object is moved even slightly and comes to the position of one of the radial grooves, the binding force will be decreased. Accordingly, probability of self-ejecting of the entrapped object ST is increased.

As shown in FIG. 8(a), when the radial groove 9 comes in the ground contacting patch during rotating, the groove wall 6 provided with the radial groove 9 is compressed generally in the tire radial direction due to the tire load. As a result, the opening of the radial groove 9 is deformed. Then, as the radial groove 9 leaves the ground contacting patch, the compressive force is removed, and the shape of the opening is restored as shown in FIG. 8(b). Such deformation and restoring are repeated during running, therefore, the self-ejecting is further promoted. Incidentally, in FIG. 8(a), the shape of the opening is exaggeratedly illustrated as being expanded by the compressive force. But, the deformed shapes are not always like this. The shapes may be irregularly changed. This is also furthersome for improving the self-ejecting.

DESCRIPTION OF THE PREFERRED EMBODIMENTS

Figure 1:
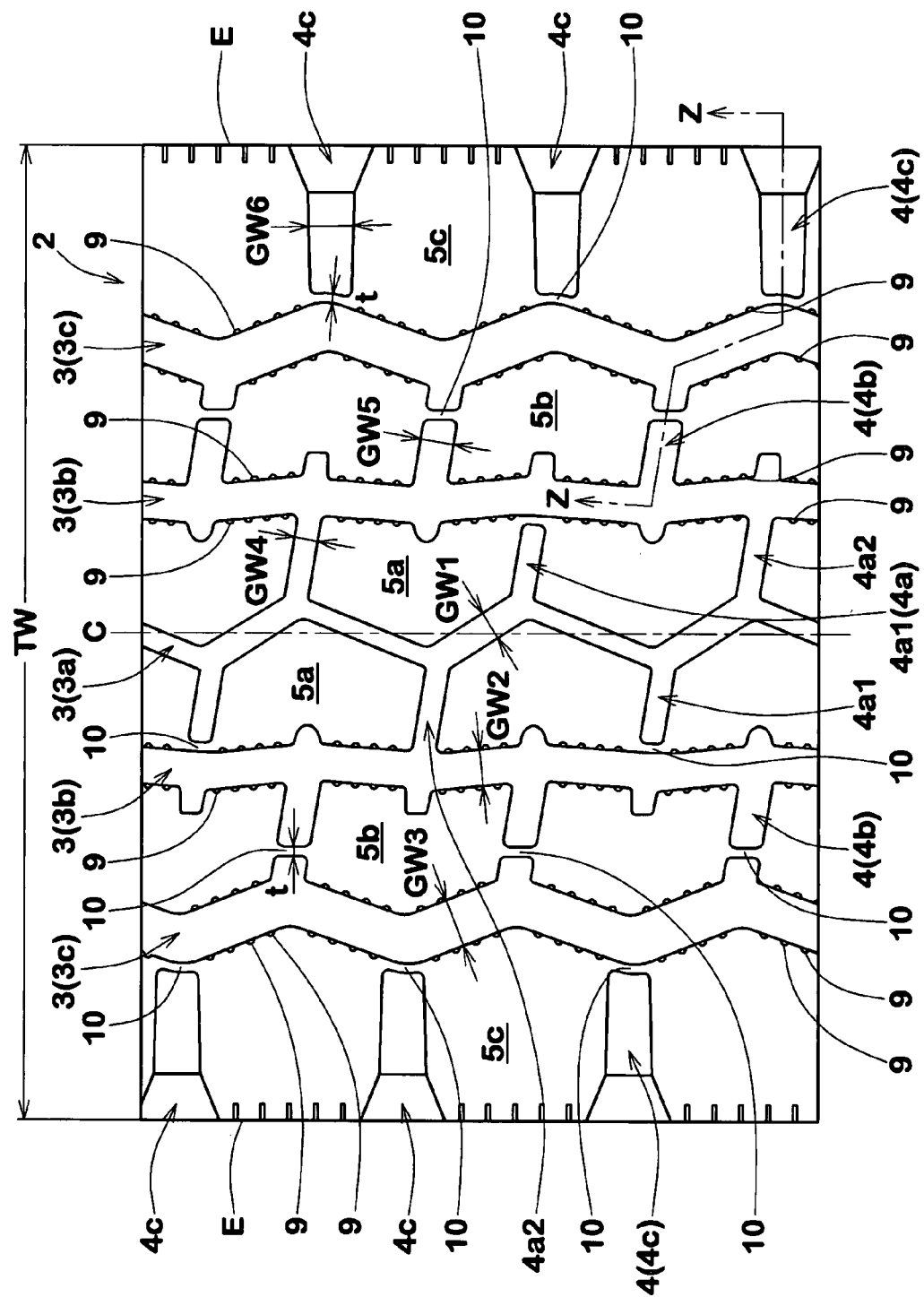
FIG. 1 is a developed view of a part of the tread portion of a pneumatic tire according to the present invention.

Embodiments of the present invention will now be described in detail in conjunction with accompanying drawings.

As well known in the tire art, a pneumatic tire comprises a tread portion 2, a pair of axially spaced bead portions, a pair of sidewall portions extending between the tread edges E and the bead portions, a carcass extending between the bead portions through the tread portion and sidewall portions, and a tread reinforcing belt disposed radially outside the carcass in the tread portion. The tread portion 2 is provided within the tread width TW with tread grooves defining a tread pattern.

Here, the tread edges E are the axial outermost edges of the ground contacting region in a normally inflated loaded condition. The tread width TW is the axial distance between the tread edges E measured in a normally inflated unloaded condition of the tire.

The normally inflated unloaded condition is such that the tire is mounted on a standard wheel rim and inflate to a standard pressure but loaded with no tire load. The normally inflated loaded condition is such that the tire is mounted on the standard wheel rim and inflate to the standard pressure and loaded with the standard tire load.

The standard wheel rim is a wheel rim officially approved for the tire by standard organization, i.e. JATMA (Japan and Asia), T&RA (North America), ETRTO (Europe), STRO (Scandinavia) and the like. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load capacity" in ETRTO, the maximum value given in the above-mentioned table in TRA or the like. In case of passenger car tires, however, the standard pressure and standard tire load are uniformly defined by 180 kPa and 88% of the maximum tire load, respectively.

According to the present invention, the tread grooves include at least one circumferential groove 3 extending continuously in the tire circumferential direction, and optionally axial grooves 4.

The circumferential groove 3 has a pair of groove walls 6 extending from the groove bottom 7 to the groove top, while each inclining outward symmetrically about the center line GL of the groove so as to gradually increase the groove width from the bottom 7 to the open top. The corners between the groove walls 6 and the groove bottom 7 are rounded to prevent stress concentration. The inclination angle of each groove wall 6 is constant from the radially outer end 6e to a point to merge into the above-mentioned rounded corner. In comparison with the central circumferential groove 3a, the groove bottoms 7 of the shoulder and middle circumferential grooves 3c and 3b are subjected to relatively large strain when the tire is inflated and when a heavy tire loaded is applied. Therefore, it is preferable for mitigating the stress that the axially outer the groove position, the larger the radius of the rounded corner.

The width GW (GW1, GW2, GW3) of the circumferential groove 3 is not less than 1.8%, preferably not less than 2.0%, but not more than 4.0%, preferably not more than 3.8% of the tread width TW.

The depth GDt of the circumferential groove 3 is not less than 7.0%, preferably not less than 7.5%, but not more than 9.0%, preferably not more than 8.5% of the tread width TW.

The groove width means the width measured at the open top perpendicularly to the center plane GL of the groove, and the groove depth means the depth from the groove top to the deepest point unless otherwise noted.

FIG. 1 shows a tread pattern according to the present invention which is designed for use with a heavy duty radial tire for trucks and buses which tire in this embodiment comprises a carcass composed of a single ply of steel cords, and a belt composed of at least two, preferably three or more plies of steel cords, including cross breaker plies.

In this example, five circumferential grooves 3 are provided, which include: a central circumferential groove 3a extending on the tire equator C; a pair of middle circumferential grooves 3b one on each side of the tire equator C; and a pair of shoulder circumferential grooves 3c axially outside the respective middle circumferential grooves 3b.

The circumferential grooves 3a, 3b and 3c may be provided with various configurations, e.g. zigzag configurations, wavy configurations, a straight configuration and the like, alone or in combination. In this example, however, in order to improve road grip performance such as traction and braking performance, all the circumferential grooves 3a, 3b and 3c have zigzag configurations of the same zigzag pitches. But, the middle circumferential groove 3b has a gentle zigzag configuration to enhance the drainage in the tire circumferential direction. The central circumferential groove 3a has a steep zigzag configuration so as to accumulate a larger volume of water removed from between the central blocks 5a and road surface. The shoulder circumferential groove 3c has a middle zigzag configuration to achieve such accumulation and the drainage in the circumferential direction at the same time in a well balanced manner.

The width GW1 of the central circumferential groove 3a, the width GW2 of the middle circumferential grooves 3b and the width GW3 of the shoulder circumferential grooves 3c are set to satisfy the following condition:

GW1<GW2<GW3 in order that the pattern rigidity can be increased in the tread central region where the ground pressure becomes relatively high. In the case that the width varies along the groove, the width GW1, GW2 or GW3 means the average width.

According to the present invention, at least one of the circumferential grooves 3 is provided with radial grooves 9. All the circumferential grooves 3 may be provided with radial grooves 9. But, in this example, as the central circumferential groove 3a has the smallest groove width and a relatively steep zigzag configuration, the air-column resonance is hard to occur, and self-ejecting of entrapped objects ST easily occurs. Therefore, the radial grooves 9 are omitted. The middle circumferential grooves 3b and shoulder circumferential grooves 3c are provided with radial grooves 9.

In the circumferential groove 3 provided with the radial grooves 9, the radial grooves 9 are formed in one of, preferably both of, the groove walls 6 and arranged in the longitudinal direction of the circumferential groove.

Figure 3:
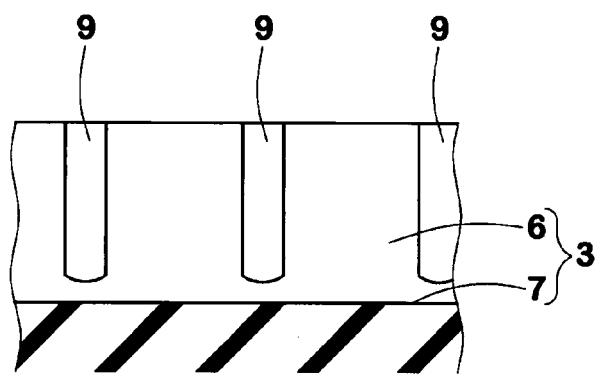
FIG. 3 is a side view of a radial groove.
Figure 4:
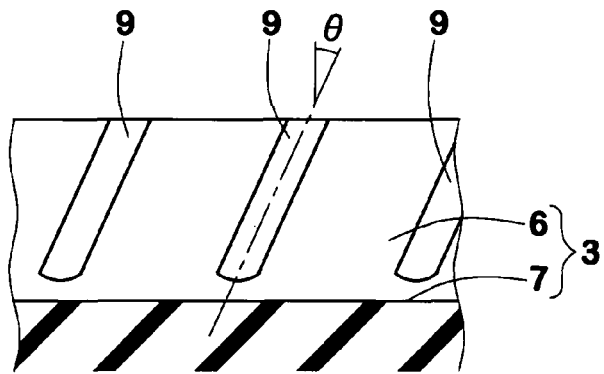
FIG. 4 is a side view of another example of the radial groove.

In this example, as shown in FIG. 3, the radial groove 9 extends substantially parallel with the tire radial direction from the radially inner end 9i to the radially outer end 9o thereof. But, as shown in FIG. 4, the radial groove 9 can be inclined with respect to the radial direction at an angle theta of not more than 45 degrees, preferably not more than 30 degrees, more preferably not more than 20 degrees when viewed from the side perpendicularly to the groove wall 6.

Figure 5:
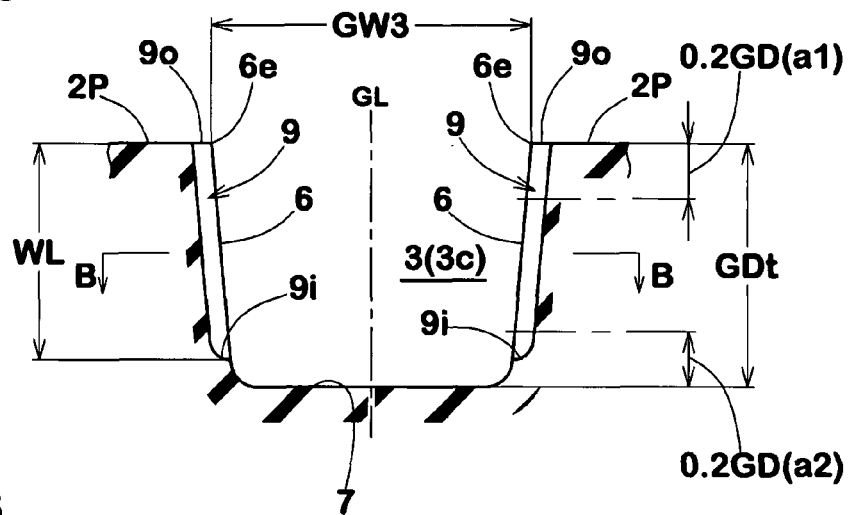
FIG. 5 is a cross sectional view taken along line A-A in FIG. 2.

As shown in FIG. 5, the radially inner ends 9i of the radial grooves 9 are positioned in a radial range (a2) from 80% to 100% of the depth GDt, namely, from 80% GDt to the groove bottom.

The radially outer ends 9o of the radial grooves 9 are positioned in a radial range (a1) from the groove top 6e to 20% of the depth GDt. Preferably, the outer ends 9o are opened in the tread face 2P.

The length WL of the radial groove 9 measured in the tire radial direction is preferably not less than 85% of the groove depth GDt.

Thus, in this embodiment, each of the radial grooves 9 extends from the groove top to about 90% of the depth GDt.

Figure 6:
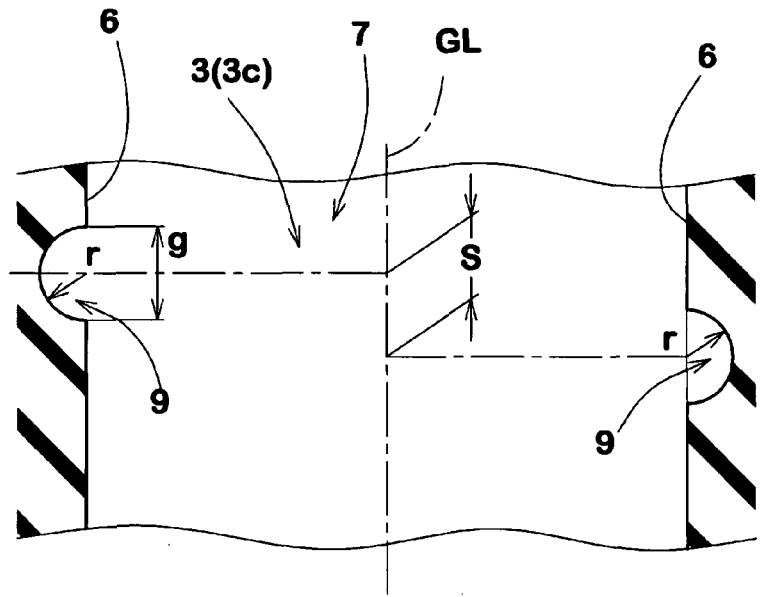
FIG. 6 is a cross sectional view taken along line B-B in FIG. 5.

As shown in FIG. 6, in the cross section parallel with the tread face, the open width (g) of the radial groove 9 is not less than 1.0 mm, preferably not less than 1.5 mm, more preferably not less than 2.0 mm, but not more than 6.0 mm, preferably not more than 5.0 mm more preferably not more than 4.0 mm. The depth of the radial groove 9 is about ⅓ to ⅔, preferably about ½ of the open width (g).

The distances between the adjacent radial grooves 9 measured along the groove wall 6 is not less than 0.8 times, preferably not less than 1.0 times, but, not more than 3.0 times, preferably not more than 2.5 times the open width (g).

In the cross section of the radial groove 9 perpendicular to the longitudinal direction of the radial groove 9, the shape of the radial groove 9 is defined by a single radius arc or a multi-radius arc which is substantially a half circle or a half oval in order to avoid a stress concentration in the groove bottom. In this example, the shape is a half circle whose radius of curvature (r) is in a range of 0.8 to 2.2 mm.

The cross sectional area and shape of the radial groove 9 are constant along the almost entire length WL, excepting the radially inner end. But it is not always necessary. The area and/or shape may be varied.

Such radial grooves 9 can be formed by a molding operation together with the tread grooves utilizing a tire vulcanization mold, or by means of cutting after the tire is vulcanized.

The number of the radial grooves 9 formed in each groove wall 6 is preferably not less than 5, more preferably not less than 6, but preferably not more than 9, more preferably not more than 8 per one pitch defined between the axial grooves 4 adjacent to the relevant groove wall 6, which pitch also corresponds to one zigzag pitch of the groove wall 6 in this example.

When both of the groove walls 6 of a circumferential groove 3 are provided with the radial grooves 9, it is preferable that the radial grooves 9 are staggered along the groove center line GL of the circumferential groove 3 as shown in FIG. 6, and the shift s therebetween is substantially ½ of one pitch K between the radial grooves 9 in the same groove wall (see FIG. 2), whereby self-ejecting of entrapped objects may be improved when compared with that by the aligned radial grooves 9.

The volume Vg (cm^3) of the circumferential groove 3 per one pitch defined between the axial grooves adjacent to one of the groove walls 6, and the number (N) of the radial grooves 9 provided in both of the groove walls 6 per the same one pitch are preferably such that the ratio (N/Vg) is not less than 3.5, more preferably not less than 4.0, but not more than 8.0, more preferably not more than 7.5. As a result, the durability of the groove walls 6, the self-ejecting performance and the noise performance can be secured in a well balanced manner.

If the radially inner ends $9i$ and radially outer ends $9o$ of the radial grooves 9 are positioned outside the above-mentioned radial ranges (a1) and (a2), the overlap between the radial grooves 9 and the entrapped objects decreases and the self-ejecting effect is decreased. Further, it becomes difficult to control the air-column resonance.

If the inclination angle theta of the radial groove 9 is more than 45 degrees, the small objects entered in the groove are rather caught on the edges of the radial grooves 9, and further the groove walls 6 are decreased in the rigidity to cause uneven wear. Furthermore, the resistance to remove the vulcanization mold from the vulcanized tire increases, therefore, the probability of damage during demolding increases.

If the above-mentioned radius of curvature (r) is less than 0.8 mm, cracks starting from the radial groove 9 are liable to occur. If the radius of curvature (r) is more than 2.2 mm, small objects entered into the circumferential groove 3 are liable to be entrapped in the radial grooves 9.

If the distances between the adjacent radial grooves 9 is less than 0.8 times the open width (g), the portion of the groove wall between the radial grooves 9 is decreased in the rigidity and damage such as tearing-off is liable to occur. If the distances between the adjacent radial grooves 9 is more than 3.0 times the open width (g), it is difficult to fulfill the original functions of the radial grooves.

In the tread pattern shown in FIG. 1, the tread grooves further include axial grooves 4. The axial grooves 4 may be provided with the above-mentioned radial grooves 9. But, in this example, radial grooves 9 are not provided.

The axial grooves 4 include: central axial grooves $4a$ between the central circumferential groove $3a$ and the middle circumferential grooves $3b$; middle axial grooves $4b$ between the middle circumferential grooves $3b$ and shoulder circumferential grooves $3c$; and shoulder axial grooves $4c$ between the shoulder circumferential grooves $3c$ and tread edges E.

Basically, the axial grooves 4 are to be extended continuously between their ends. Even when the undermentioned optional shutoff wall 10 is provided in the axial groove 4, it is desirable that the axial groove 4 extends continuously almost all over the original length thereof.

The tread portion 2 is therefore divided into: central blocks $5a$ between the central circumferential groove $3a$ and middle circumferential grooves $3b$; middle blocks $5b$ between the middle circumferential grooves $3b$ and shoulder circumferential grooves $3c$; and shoulder blocks $5c$ between the shoulder circumferential grooves $3c$ and tread edges E.

The width GW4 of the central axial grooves $4a$, the width GW5 of the middle axial grooves $4b$ and the width GW6 of the shoulder axial grooves $4c$ are not less than 2.0%, preferably not less than 2.5%, but not more than 5.5%, preferably not more than 5.0% of the tread width TW.

The depths GDy of the axial grooves 4 are not less than 5.0%, preferably not less than 5.5%, but not more than 9.0%, preferably not more than 8.5% of the tread width TW.

The axial grooves $4a$ and $4b$ between the zigzag circumferential grooves $3a$, $3b$ and $3c$ are extended along straight lines drawn between zigzag peaks of the axially adjacent circumferential grooves $3a$, $3b$ and $3c$.

In order to improve the tread pattern noise and wet performance, the central and middle axial grooves $4a$ and $4b$ are inclined to the same direction (in FIG. 1, left-side upward inclination) at an angle of less than 45 degrees, preferably less than 30 degrees with respect to the tire axial direction.

However, the shoulder axial grooves $4c$ are not inclined in order to increase the rigidity and the wear resistance of the shoulder blocks $5c$. The shoulder axial grooves $4c$ are substantially parallel with the tire axial direction, namely, the angle of each shoulder axial groove $4c$ is 0 to 5 degrees with respect to the tire axial direction.

If the air in the axial grooves 4 is compressed in the ground contact patch during running and the compressed air jets into the circumferential groove 3, there is a possibility that an air-column resonance in the circumferential groove 3 is caused or the already occurred resonance is further aggravated.

In this example, therefore, membranous or very thin shutoff walls 10 are formed in the axial grooves 4 in order to prevent the compressed air in the axial grooves 4 from jetting into to the circumferential groove 3. The shutoff wall 10 extends from the groove bottom to the groove top of the axial groove 4 to completely block the axial groove 4. If the thickness (t) of the shutoff wall 10 is less than 0.75% of the tread width TW, it is highly possible that the shutoff wall 10 is broken or torn at an early stage of the tread wear life. If the thickness (t) is more than 1.3%, the resultant deterioration in the drainage performance becomes not negligible. Therefore, it is preferable that the minimum thickness (t) of the shutoff wall 10 is set in a range of 0.75 to 1.3% of the tread width TW.

Such shutoff walls 10 can completely reduce so called pumping noise caused by a jet flow of compressed air, and further, noise sound caused by the impact of contact between the tread blocks (esp. their edges) and the road surface may be reduced.

All of the axial grooves 4 can be provided with the shutoff walls 10. But, in this example, not all the grooves 4 are provided. Every two of the central axial grooves $4a$ are provided with the shutoff walls 10, but the middle and shoulder axial grooves $4a$ and $4c$ are each provided with one shutoff wall 10. In other words, the central axial grooves $4a$ are first central axial grooves $4a1$ with the shutoff walls 10 and second central axial grooves $4a2$ without the shutoff walls 10 which alternate in the tire circumferential direction.

As to the positions of the shutoff walls 10, in the case of the shoulder axial grooves $4c$, it is preferable that the shutoff walls 10 are formed near or at the axially inner ends of the shoulder axial grooves $4c$, so as not to hinder the drainage from the tread shoulder zone to the tread edge E.

In the case of the middle axial grooves $4b$, if the shutoff walls 10 are formed at the axially outer ends of the middle axial grooves $4b$, drainage from the tread middle zone becomes worse. If the shutoff walls 10 are formed at the axially inner ends of the middle axial grooves 4b, the air compressed in the middle axial grooves 4b jets into the shoulder circumferential grooves 3c and the noise performance becomes deteriorated. Therefore, it is preferable that the shutoff wall 10 in each of the middle axial grooves 4b is formed in the middle of the groove length. More specifically, in this example, as the shoulder circumferential grooves 3c are wider than the middle circumferential grooves 3b, in order to decrease the air volume jetting into the shoulder circumferential grooves 3c than the air volume jetting into the middle circumferential grooves 3b, the shutoff wall 10 is axially outwardly shifted from the center of the groove length.

In the case of the central axial grooves 4a1, it is preferable that the shutoff walls 10 are formed near or at the axially outer ends of the central axial grooves 4a1, so as to prevent the air compressed in the central axial grooves 4a1 from jetting into the middle circumferential grooves 3b, while leading the water existing in the tread center zone defined between the two middle circumferential grooves 3b to the central circumferential groove 3a.

As the central axial grooves 4a2 without the shutoff walls 10 alternate with the grooves 4a1, the grooves 4a2 can provide an adequate amount of drainage for the overflow from the tread center zone to the middle circumferential grooves 3b.

In this example, further, the axial grooves 4 are each provided with a tie-bar 11 raising from the groove bottom and extending between the groove walls, so that the circumferentially adjacent blocks 5a, 5b, 5c can provide a support from each to other through the tie-bar.

The height (h) of the tie-bar 11 from the groove bottom (deepest position) is preferably not less than 25%, more preferably not less than 30%, but not more than 80%, more preferably not more than 60% of the depth GDy of the axial groove 4.

The length RL of the tie-bar 11 measured along the axial groove 4 is less than the length L of the axial groove 4, preferably 30 to 90% of the length L.

In the case of the axial groove provided with the shutoff wall 10, the tie-bar 11 is extended from the shutoff wall 10 towards one side thereof.

Figure 2:
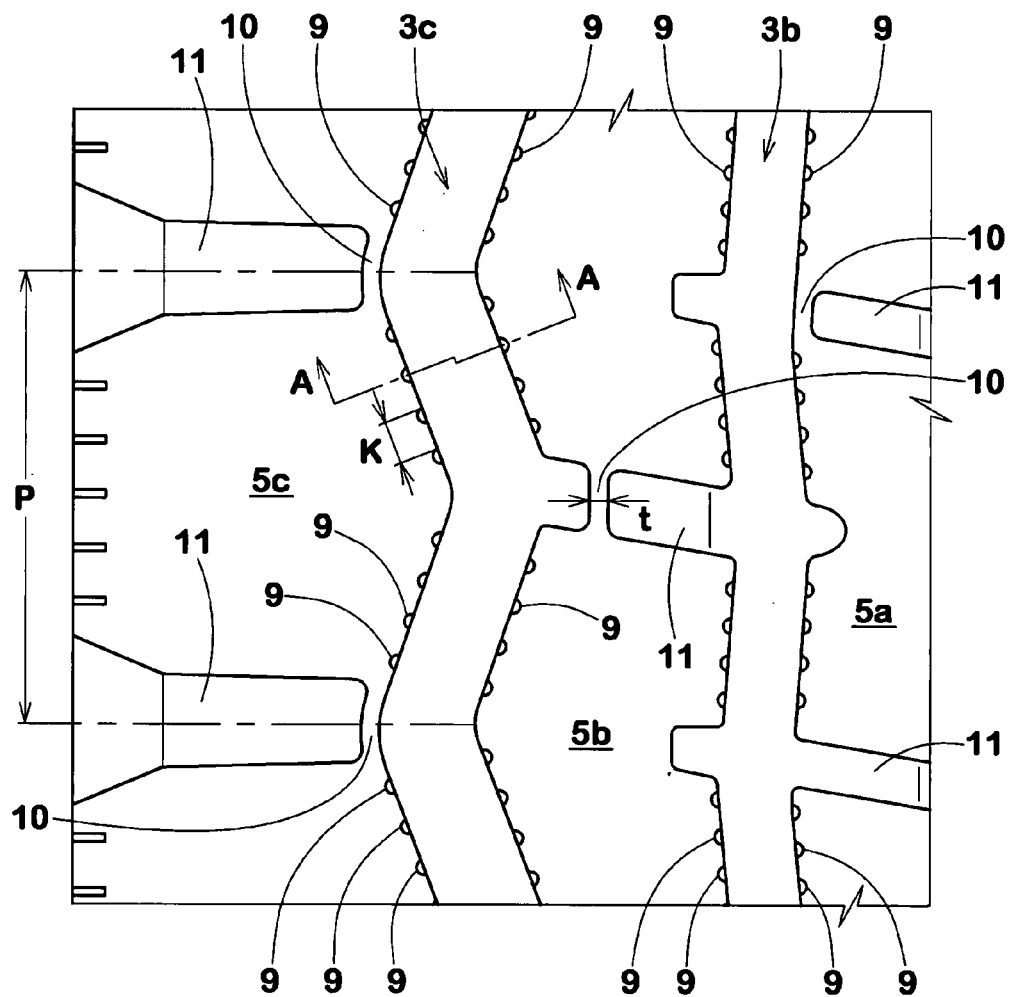
FIG. 2 is an enlarged partial view thereof.
Figure 7:
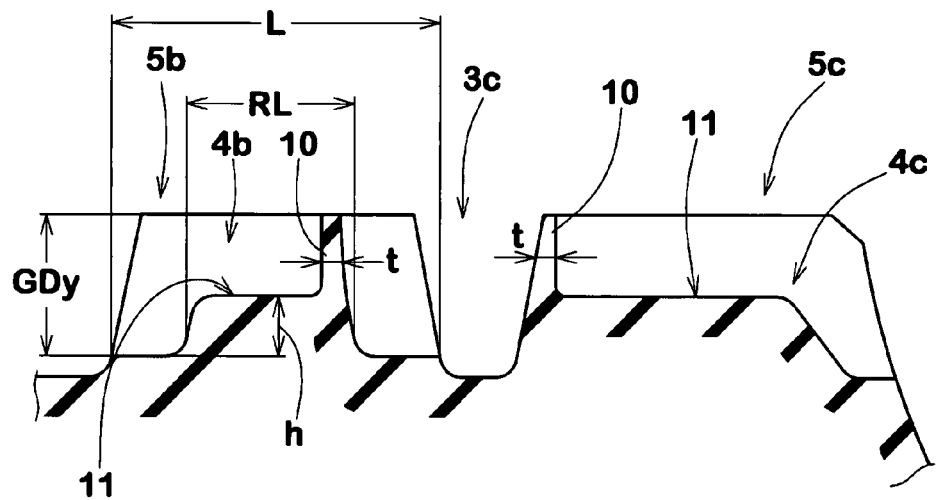
FIG. 7 is a cross sectional view taken along line Z-Z in FIG. 1.
Figure 8A:
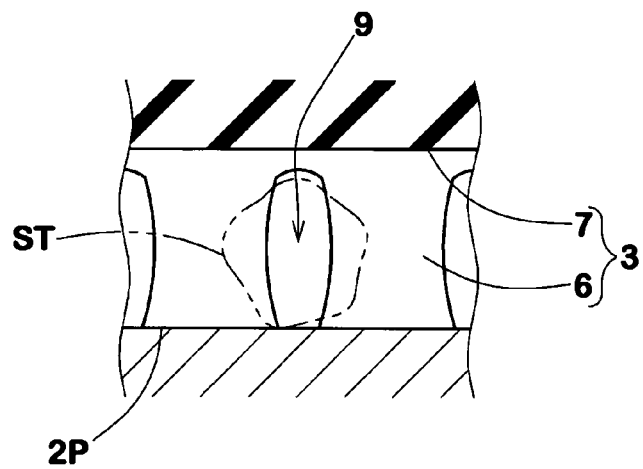
FIGS. 8(a) and 8(b) are diagrams showing a behavior of the radial groove.
Figure 8B:
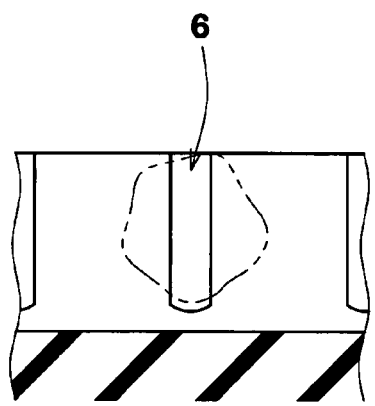

In the middle axial grooves 4b in this example, as the shutoff wall 10 is shifted axially outwards, the tie-bar 11 is formed on the axially inside of the shutoff wall 10 as shown in FIGS. 2 and 7. In the shoulder axial grooves 4c in this example, as the shutoff wall 10 is disposed at the axially inner groove end, the tie-bar 11 is formed on the axially outside of the shutoff wall 10 as shown in FIGS. 2 and 7. In the central axial grooves 4a1 in this example, as the shutoff wall 10 is disposed at the axially outer groove end, the tie-bar 11 is formed on the axially inside of the shutoff wall 10. In the central axial grooves 4a2, the tie-bar 11 is formed in the same position as the central axial groove 4a1. Therefore, by the tie-bars 11, the blocks 5a-5c are increased in rigidity in the tire circumferential direction, and the steering stability, uneven wear and the like can be improved.

As the shutoff walls 10 are coupled with the tie-bars 11, the durability of the shutoff walls 10 can be improved.

Comparison Tests

Heavy duty radial tires of size 11R22.5 (rim size: 7.50× 22.5) were made and tested for stone-entrapment, noise performance, wet performance, durability of the radial grooves, and durability of the shutoff walls.

The test tires had identical internal structures comprising a carcass composed of a single ply of steel cords arranged radially at 90 degrees with respect to the tire equator, and a tread reinforcing belt composed of four plies of steel cords.

The tires had the same tread patterns shown in FIG. 1 except for the radial grooves 9 and shutoff walls 10. The specifications are shown in Table 1.

Stone-Entrapment Test

A 2-D wheel type 10-ton truck (no-load) provided on all the wheels with test tires was run on a gravel road at a speed of 10 km/h for 100 meters. Then the number of the gravel stones entrapped in the middle and shoulder circumferential grooves 3b and 3c of all the tires was counted to obtain the average number of the entrapped gravel stones per tire. The test results are indicated in Table 1 by an index based on Ref. 1 being 100, wherein the larger is better.

Pass-by Noise Test

According to the "Test Procedure for Tire Noise" specified in Japanese JASO-C606, the test car was coasted for 50 meter distance at a speed of 70 km/h in a straight test course, and the maximum noise sound level dB(A) was measured with a microphone set at 1.2 meter height from the road surface and 7.5 meter sideways from the running center line in the midpoint of the course. The results are shown in Table 1 together with the difference from Ref. 1.

Wet Performance Test

The test car was run along a 100 meter radius circle on an asphalt road partially provided with a 5 mm-depth, 20 m-long water pool, and the lateral acceleration (lateral G) during running in the water pool was measured at the front wheels, gradually increasing the speed entering into the water pool, to obtain the average lateral acceleration for the speed range of from 50 to 80 km/h. The results are indicated in table 1 by an index based on Ref. 1 being 100, wherein the larger is better.

Durability Test

After the test car was run for 100000 km, the radial grooves and shutoff walls of the test tires were visually checked for damage, e.g. breaking, tear, cracks and the like, and the numbers of the damaged radial grooves and shutoff walls were counted. The results are indicated in Table 1 as the percentage to the original numbers.

TABLE 1

| Tire | Ref. 1 | Ref. 2 | Ref. 3 | Ex. 1 | Ex. 2 | Ex. 3 | Ex. 4 | Ex. 5 | Ex. 6 | Ex. 7 |
|---|---|---|---|---|---|---|---|---|---|---|
| Radial grooves | | | | | | | | | | |
| Number *1 | — | 8 | 8 | 8 | 8 | 8 | 8 | 8 | 8 | 8 |
| Radius r (mm) | — | 0.5 | 2.5 | 1.0 | 1.5 | 2.0 | 1.5 | 1.5 | 1.5 | 1.5 |
| WL/GDt (%) | — | 90 | 90 | 90 | 90 | 90 | 90 | 90 | 90 | 90 |
| Shutoff walls t/TW (%) *2 | — | — | — | — | — | — | 0.80 | 1.25 | 0.60 | 1.45 |
| Stone-entrapment | 100 | 106 | 100 | 110 | 108 | 109 | 108 | 109 | 108 | 109 |
| Pass-by noise dB(A) | 75 | 72 | 71 | 72 | 71 | 69 | 69 | 68 | 69 | 68 |
| Difference from Ref. 1 | 0 | −3 | −4 | −3 | −4 | −6 | −6 | −7 | −6 | −7 |

TABLE 1-continued

| Tire | Ref. 1 | Ref. 2 | Ref. 3 | Ex. 1 | Ex. 2 | Ex. 3 | Ex. 4 | Ex. 5 | Ex. 6 | Ex. 7 |
|---|---|---|---|---|---|---|---|---|---|---|
| Wet performance | 100 | 103 | 104 | 105 | 104 | 103 | 102 | 101 | 104 | 98 |
| Damaged radial grooves (%) | — | 25.2 | 0 | 0.40 | 0.25 | 0.11 | 0.30 | 0.22 | 0.23 | 0.25 |
| Damaged shutoff walls (%) | — | — | — | — | — | — | 2.5 | 0.75 | 22.0 | 0 |

*1 Number of Radial grooves on one groove wall per one pitch
*2 Tread width TW = 214 mm From the test results, it can be confirmed that the noise performance and stone-entrapment can be improved, without sacrificing the wet performance.

As described above, the present invention is suitably applied to the heavy duty tire. But, it is also possible to apply the invention to various tires such as passenger car tires, and motorcycle tires.

The invention claimed is:

1. A pneumatic tire comprising
a tread portion provided with a circumferential groove extending continuously in the tire circumferential direction and having a pair of oppositely opposed groove walls,
said circumferential groove provided in at least one of the groove walls with radial grooves arranged along the longitudinal direction of the circumferential groove,
each said radial groove having
a radially outer end positioned in a range (a1) of from 0 to 20% of the depth (GDt) of the circumferential groove, and
a radially inner end positioned in a range (a2) of from 80 to 100% of the depth CGDt) of the circumferential groove, and
the radial groove having an opening width (g) of not less than 1.0 mm, but not more than 6.0 mm,
wherein
the tread portion is provided in its central zone with a central circumferential groove extending continuously in the tire circumferential direction, not provided with said radial grooves, and further
the tread portion is provided with axial grooves on each side of the circumferential groove which is provided with the radial grooves,
said axial grooves are provided with shutoff wall extending from the groove bottom to the groove top and having a thickness of 0.75 to 1.30% of the tread width (TW),
said axial grooves provided with the shutoff walls extend between the central circumferential groove and the axially outer circumferential groove disposed on each side of the central circumferential groove, and
between the central circumferential groove and the axially outer circumferential groove, axial grooves without the shutoff walls are further provided alternately with said axial grooves provided with the shutoff walls.

2. A pneumatic tire comprising a tread portion provided with a zigzag circumferential groove extending continuously in the tire circumferential direction and having a pair of oppositely opposed groove walls,
said circumferential groove provided in each of the groove walls with radial grooves arranged along the longitudinal direction of the circumferential groove,
each said radial groove having
a radially outer end positioned in a range (a1) of from 0 to 20% of the depth (GDt) of the circumferential groove, and
a radially inner end positioned in a range (a2) of from 80 to 100% of the depth (GDt) of the circumferential groove, and
the radial groove having an opening width (g) of not less than 1.0 mm, but not more than 6.0 mm,
wherein in a cross section of the radial groove perpendicular to the longitudinal direction of the radial groove,
the shape of the radial groove is substantially a half circle having a radius in a range of 0.8 to 2.2 mm and the shape and cross sectional area of the radial groove are constant along the almost entire length of the radial groove, excepting the radially inner end,
the distances between the adjacent radial grooves in each groove wall measured along the groove wall is not less than 0.8 times and not more than 3.0 times the opening width (g),
the number of the radial grooves in each groove wall is not less than 5 but not more than 9 per one zigzag pitch of the zigzag circumferential groove, and
the radial grooves provided in both of the groove walls are staggered along the groove center line of the zigzag circumferential groove, wherein
the tread portion is further provided in its central zone with a central zigzag circumferential groove extending continuously in the tire circumferential direction, not provided with said radial grooves,
said zigzag circumferential groove provided with the radial grooves is wider than the central zigzag circumferential groove and disposed on each side of the central zigzag circumferential groove,
the tread portion is further provided with axial grooves on each side of the zigzag circumferential groove which is provided with the radial grooves,
said axial grooves are provided with shutoff wall extending from the groove bottom to the groove top and having a thickness of 0.75 to 1.30% of the tread width,
said axial grooves provided with the shutoff walls extend between the central zigzag circumferential groove and the zigzag circumferential groove on each side of the central zigzag circumferential groove, and
between the central zigzag circumferential groove and the zigzag circumferential groove, axial grooves without the shutoff walls are further provided alternately with said axial grooves provided with the shutoff walls.

3. The pneumatic tire according to claim 2, wherein
the axial grooves are provided with tie-bars extending from the shutoff walls.

* * * * *